United States Patent [19]

Tokuhara et al.

[11] Patent Number: 4,764,331
[45] Date of Patent: Aug. 16, 1988

[54] LARGE DIAMETER OPTICAL DISK SUBSTRATE MADE OF POLYCARBONATE

[75] Inventors: Shinji Tokuhara, Kobe; Yoshio Onizawa, Hyogo; Shuzo Iyoshi, Himeji, all of Japan

[73] Assignee: Daicel Chemical Industries, Ltd., Osaka, Japan

[21] Appl. No.: 42,901

[22] Filed: Apr. 27, 1987

Related U.S. Application Data

[62] Division of Ser. No. 692,159, Jan. 17, 1985.

[30] Foreign Application Priority Data

Jan. 26, 1984 [JP] Japan .................................. 59-12565

[51] Int. Cl.$^4$ ............................................. B29F 1/08
[52] U.S. Cl. .............................. 264/328.16; 264/1.1; 264/106; 264/328.17
[58] Field of Search ............ 264/1.1, 1.3, 106, 328.12, 264/328.14, 328.16, 328.17

[56] References Cited

U.S. PATENT DOCUMENTS 4,157,931  6/1979  Bricot et al. ..................... 264/106 X
4,185,955  1/1980  Holmes et al. ................... 264/106 X
4,514,357  4/1985  Kawaguchi et al. ........... 264/328.16

OTHER PUBLICATIONS

Review of the Electrical Communication Laboratories, vol. 32, No. 2, 1984.

*Primary Examiner*—Charles Hart
*Attorney, Agent, or Firm*—Armstrong, Nikaido, Marmelstein & Kubovcik

[57] ABSTRACT

A disk substrate for a high-density information recording medium made by injection molding from polycarbonate is disclosed having an average molecular weight from 14,000 to 22,000 and having a thickness from 1.0 to 2.0 mm and a circular recording area of between two concentric circles having a radii of 40 to 170 mm, respectively. The birefringence of the substrate within the recording area is less than 25 mm and is uniformly distributed.

2 Claims, 3 Drawing Sheets

FIG. 4
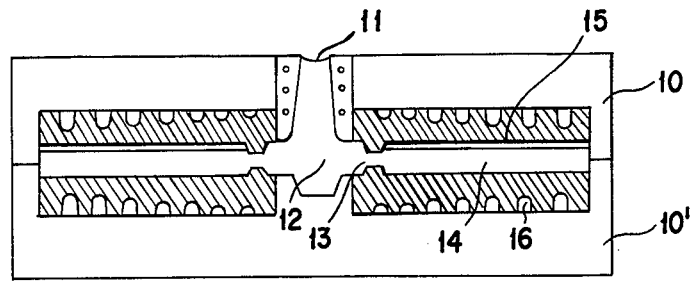
FIG. 5
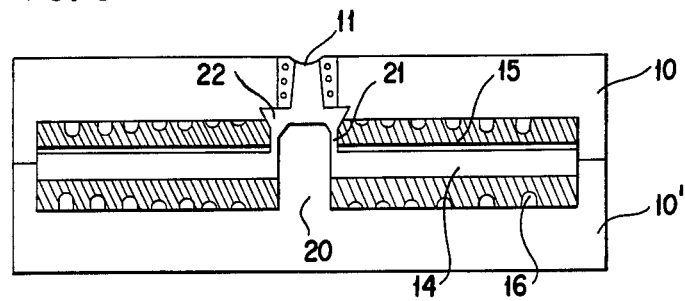
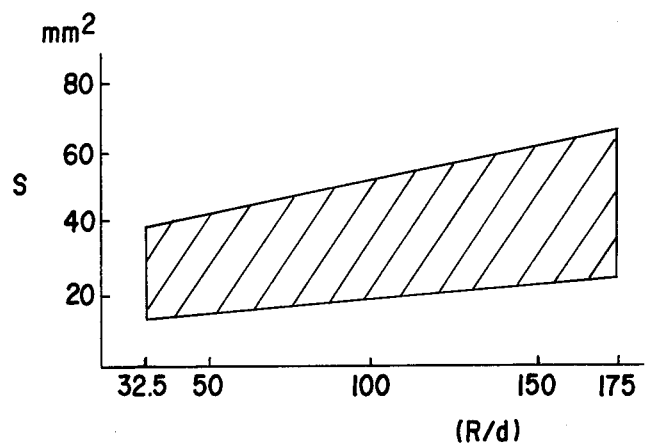
FIG. 6

LARGE DIAMETER OPTICAL DISK SUBSTRATE MADE OF POLYCARBONATE

This is a division of application Ser. No. 692,159 filed Jan. 17, 1985.

BACKGROUND OF THE INVENTION

The plastic substrate for a high-density information recording medium for use in an optical recording-reproducing apparatus (referred to as an optical disk substrate for short) is produced by photopolymerization process or injection molding. Since the former process requires an UV apparatus for curing and is low in productivity, research and development efforts have been directed to the production by injection molding.

The raw materials for injection molding which are preferred because of transparency and stability include acrylic resin, polycarbonate resin, polyester resin, and methylpentene resin, with the first two being in general use. The resins are required to meet the strict requirements regarding optical properties (e.g., transparency and birefringence), physical properties (e.g., impact strength and dimensional stability), chemical properties (e.g., moisture absorption), and moldability (e.g., flowability and transferability).

The optical disk substrate should satisfy all the requirements so that it permits the recording of information in the form of submicron pits each smaller than individual particles of cigarette smoke. The details of these characteristic properties are described in "Nikkei Electronics", 1982, 6–7, pp. 133–152, published by Nikkei McGraw-Hill Co., Ltd.

As mentioned in this literature, the optical disk has already been put to practical use. For example, acrylic resin is used to make large video disks and DRAW disks up to 300 mm in diameter, and polycarbonate resin is used to make small compact disks up to 120 mm in diameter. Although acrylic resin can be made into large disks (300 mm in diameter) because of the low melt viscosity, ease of injection molding, and low birefringence, the disks made of acrylic resin seem inadequate for storage over a long period of time because they absorb a large amount of moisture, resulting in deformation with time. Moreover, they are liable to heat distortion encountered during metal film deposition.

On the other hand, polycarbonate resin has good resistance to heat distortion caused by metal film deposition and is low in moisture absorption. However, it has a disadvantage in that when it is made by injection molding into a large disk having a diameter of 130 mm or more, the birefringence becomes great to such an extent that marks recorded on the disk cannot be read optically. For this reason, polycarbonate resin has not been used for optical disks of a large diameter.

The fact that polycarbonate resin can be made by injection molding into small compact disk substrates having a diameter of 120 mm or less is already known as disclosed in the above-mentioned literature and Japanese Patent Laid-Open Nos. 126119/1983 and 180553/1983. However, nothing has so far been disclosed as to producing a large optical disk substrate having a diameter of 130 mm or more from polycarbonate resin by injection molding. It is to be noted that if the diameter of the disk is increased from 120 mm to 200 mm, or multiplied by the ratio of 1.7, the area of the disk becomes 2.8 times greater. Thus, for this enlarged optical disk, it is extremely difficult to keep the birefringence of the entire recording surface of the optical disk 25 nm or less in its magnitude and uniform in distribution.

SUMMARY OF THE INVENTION

The present invention relates to a plastic substrate for a high-density information recording medium such as video disk, compact disk, DRAW disk, and E-DRAW disk for use in an optical recording-reproducing apparatus. More particularly, it relates to a polycarbonate disk substrate having a diameter from 130 mm to 350 mm and a birefringence value of less than 25 nm. It also relates to a process for producing such a large disk substrate by injection molding.

It is an object of this invention to provide a polycarbonate optical disk substrate made by injection molding which has a diameter of 130 mm or more and a birefringence value of 25 nm or less.

It is another object of this invention to provide a process for producing by injection molding a large polycarbonate optical disk substrate which has a diameter of 130 mm or more and a birefringence value of 25 nm or less.

It is still further another object of this invention to provide a mold for use in injection molding the above-mentioned large polycarbonate optical disk substrate.

BRIEF DESCRIPTION OF THE DRAWINGS

The advantage, nature and additional features of the invention become more apparent from the following description taken in connection with the accompanying drawing, in which:

FIGS. 4 and 5 are schematic drawings of the structure of the previously known mold for use in injection molding of the optical disk; and FIG. 6 is a diagram showing the relationship between the sectional area (S) of the gate of the mold for use in injection molding in this invention and the radius/thickness (R/d) ratio.

DETAILED DESCRIPTION OF THE PREFERRED EMBODIMENTS

Figure 1:
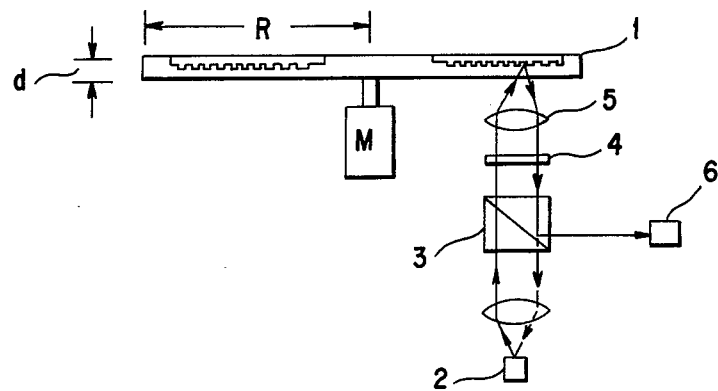
FIG. 1 is a schematic drawing illustrating the principle of the optical recording-reproducing system.

In the outset, the fundamental principle of optical recording and reproducing information will be explained with reference to FIG. 1 for a better understanding of the significance of the optical disk substrate with low birefringence of this invention.

The linearly polarized light emitted from the semiconductor laser (2) passes through the beam splitter (3) and the ¼ wave plate (4) that changes the linearly polarized light into circularly polarized light. The light is then converged to a spot, 0.5 to 1 μm in diameter, by the convergent lens (5), and the converged light enters a pit on the optical disk (1). In the case of the reflection type optical disk, the light is reflected by the pit and the polarizing direction of the laser beam (which has been circularly polarized) is reversed with respect to the forward direction. When the circularly polarized light passes through the ¼ wave plate (4), it is changed again into the linearly polarized light, which then enters the beam splitter (3). The returning light does not pass through the beam splitter but is reflected by it toward the light detector (6), because the plane of polarization of the returning light is shifted 90° with respect to the forward direction.

What is mentioned above takes place in the case where the optical disk has no birefringence. If the optical disk has birefringence, the light reflected by the optical disk, when it passes through the ¼ wave plate 4, is not changed into linearly polarized light having the plane of polarization which is shifted exactly 90° with respect to the incident light. This results in phase shift. As the result, the returning light is not completely reflected by the beam splitter 3, and a part of it reaches the semiconductor laser (2), as indicated by the dotted line, causing noise and reducing the S/N ratio.

The above-mentioned undesirable birefringence is attributable to the phase difference that takes place when light travels in different directions in plastics. The phase difference occurs in the case where the refractive indices measured along two axes are different. Assuming that the refractive indices in direction x and direction y are $n_x$ and $n_y$, respectively, phase difference occurs in component x and component y of the light passing through the plastics. This phase difference is represented by angle $\delta$ which is defined by the following equation (1):

$$\delta = \frac{2\pi}{\lambda}(n_x - n_y)d \quad (1)$$

where $\lambda$ is the wavelength of light and d is the distance of the plastics over which the light travels. Usually, birefringence is expressed in an absolute value of $\Delta nd = (n_x - n_y)d$. It is desirable that this absolute value be small, preferably, in practical use less than 25 nm.

It is considered that birefringence in a plastic optical disk substrate made by injection molding results mainly from molecular orientation and residual strain. To eliminate these causes, many experiments were carried out under various conditions with plastics having different properties. However, it has so far been impossible to reduce the birefringence below 25 nm for a polycarbonate optical disk substrate having a diameter of 130 mm or more.

In this invention, the present inventors succeeded in reducing the birefringence to a great extent, thereby opening up the way for practical application of a large polycarbonate optical disk substrate having a diameter of 130 mm or more.

The polycarbonate optical disk substrate of this invention has the following features. It is made by injection molding from polycarbonate resin having an average molecular weight of 14,000 to 22,000. It has a thickness of 1.0 to 2.0 mm and a radius of 65 to 175 mm. It is used as a substrate for a high-density information recording medium. Birefringence is less than 25 nm within the recording area between two concentric circles, having radii of 40 mm and 170 mm.

The above-mentioned polycarbonate is preferably bis(hydroxyphenyl)alkane polycarbonate. Moreover, the birefringence is found uniformn in the middle portion of the recording area and smoothly varies at the boundaries of both edges of recording area.

In a specific embodiment of this invention, for the polycarbonate disk substrate having a radius of 100 mm, the birefringence is less than 25 nm in the recording area between two concentric circles, having radii of 40 mm and 100 mm, respectively.

Figure 2:
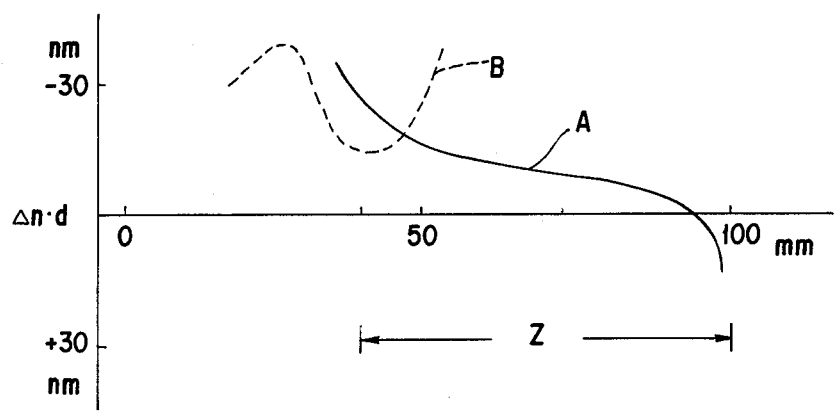
FIG. 2 is a diagram showing a relationship between the radius (R) of the optical disk and the birefringence ($\Delta$nd) of the disk, in which solid line (A) represents the data of the optical disk of this invention measured by the single-pass method and dotted line (B) represents the data of the previously known optical disk disclosed in Example 1 in the Japanese Patent Laid-Open No. 180553/1983 measured by the double-pass method.

FIG. 2 is a diagram in which the birefringence ($\Delta nd$) is plotted with respect to the radius (R) of the polycarbonate optical disk substrate. Curve A represents the large substrate of this invention, and curbe B (dotted line) represents a conventional small substrate as disclosed in Example 1 in Japanese Patent Laid-Open No. 180553/1983. In the meantinme, the birefringence indicated by curve A was measured by the single-pass method, and the one indicated by curve B was measured by the double-pass method.

As FIG. 2 shows, in the case of the optical disk substrate of this invention, the birefringence is low and uniform in the recording area indicated by zone Z.

Following is a description of the process for producing the large polycarbonate optical disk substrate of this invention. The characteristic properties of the optical disk substrate produced by injection molding are affected, mainly, by the following three factors.

1. Polycarbonate resin,
2. Molding conditions, and
3. Mold.

These factors are closely related with one another. The present inventors found the optimum factors that make is possible to reduce the birefringence below 25 nm for the polycarbonate optical disk substrate having a diameter of 130 mm or more.

Important factors regarding the polycarbonate resin are the type and molecular weight of the resin. The preferred type of the resin among the present commercial products is bis(hydroxyphenyl) alkane polycarbonate.

Bis(hydroxyphenyl) alkane polycarbonate is an aromatic hydrocarbon polymer expressed by the formula

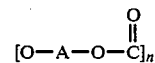

(wherein A is a divalent aromatic group derived from a dihydric phenol) produced by reacting a hydroxyl(-mononucleus or polynucleus aryl) compound such as bis(4-hydroxyphenyl) alkane with a carbonate precursor such as phosgene and formate or a carbonate ester.

The dihydric phenol has two hydroxyl groups as the functional groups attached directly to the aromatic carbon atoms. Typical examples include:
2,2-bis-(4-hydroxyphenyl)-propane,
hydroquinone,
resorcinol,
2,2-bis-(4-hydroxyphenyl)-pentane,
2,4'-dihydroxydipheylmethane,
bis-(2-hydroxyphenyl)-methane,
bis-(4-hydroxyphenyl)-methane,
bis-(4-hydroxy-5-nitrophenyl)-methane,
1,1-bis-(4-hydroxyphenyl)-methane,
3,3-bis-(4-hydroxyphenyl)-pentane,
2,6-dihydroxynaphthalene,
bis-(4-hydroxyphenyl)-sulfone,
2,4'-dihydroxydiphenylsulfone,
5'-chloro-2,4'-dihydroxydiphenylsulfone,
bis-(4-hydroxyphenyl)-diphenyldisulfone, 4,4'-dihydroxydiphenyl ether,
3,3'-dichlorodiphenyl ether,
4,4'-dihydroxy-2,5-diethoxydiphenyl ether, and 2,2-(4,4'-dihydroxy-3,3',5,5'-tetrahalodiphenyl)-propane.

As to carbonate ester, diphenyl carbonate is preferably; however, dimethyl carbonate, diethyl carbonate phenyl methyl carbonate, phenyl tolyl carbonate, and di-(tolyl) carbonate are also applicable.

In the case where a carbonyl halide like phosgene is used as the carbonate precursor, polycarbonate is formed by the condensation reaction in the presence of a free-acid capture substance and, in the case where a carbonate ester is used, it is formed by the ester exchange reaction under reduced pressure.

As to the molecular weight of the polycarbonate resin, the average molecular weight is preferably from 14,000 to 22,000 with respect to the mechanical properties and moldability thereof. One having an averge molecular weight of less than 14,000 is poor in mechanical properties such as impact strength and one having an average molecular weight of more than 22,000 decreases the optical disk substrate property such as transferability or the like due to excessive high melt viscosity.

In order to prevent degradation and decomposition of the polycarbonate that occurs at the time of melting of the same, an antioxidant may be added. However, such an additive should not be used as far as possible because it might adversely affect the recording medium on the substrate.

Among many factors, including process control program, which govern the molding conditions, the following two are of crucial importance to the characteristic properties of the optical disk substrate of this invention.

1. Residence time of the resin in the injection cylinder.
2. The flow rate of injection at which the molten resin is forced into the cavity.

In order to prevent the thermal decomposition of the resin and to permit the fast forward movement of the screw, the residence time (t minutes) of the resin in the injection cylinder should meet the conditions defined by the following equation (2):

$$t \leq 14 - \frac{1}{10}(T - 300) \quad (2)$$

where T is the temperature (°C.) of the injection cylinder.

The injection cylinder temperature (T) varies depending on the type and molecular weights of the resin. It is usually 330° to 400° C. in the case of the above-mentioned bis(hydroxyphenyl) alkane polycarbonate.

The lower limit of the residence time (t) is not specifically restricted; but apparently, it should be long enough for the resin to be uniformly plasticized. Thus, the lower limit is determined by the injection molding machine employed. If the residence time is longer than specified by equation (2), the resin will decompose within the injection cylinder, resulting in degradation of the properties of the optical disk substrate.

The residence time may be accurately controlled by adjusting the feed to the heating cylinder of the injection molding machine and by feeding the resin at a constant rate.

The injection speed at which the molten resin is forced into the mold cavity should preferably be as high as possible. After a series of experiments, it was found that the flow rate (V ml/sec) at which the molten resin is forced into the mold cavity should be within the area between the upper and lower lines on a semilogarithmic graph, with R/d graduated at regular intervals on the abscissa and V graduated in logarithm on the ordinate, defined by the following equations.

For R/d in the range of $32.5 \leq R/d \leq 100$:

$$\frac{\log 2}{100}\left(\frac{R}{d}\right) - 1.5 \log 2 + 1 \leq \log V \leq \frac{1}{100}\left(\frac{R}{d}\right) + 1.5 \quad (3)$$

For R/d in the range of $75 \leq R/d \leq 150$:

$$\frac{1}{100}\left(\frac{R}{d}\right) - 0.5 \log 2 \leq \log V \leq \frac{1}{100}\left(\frac{R}{d}\right) + 1.5 \quad (4)$$

Figure 3:
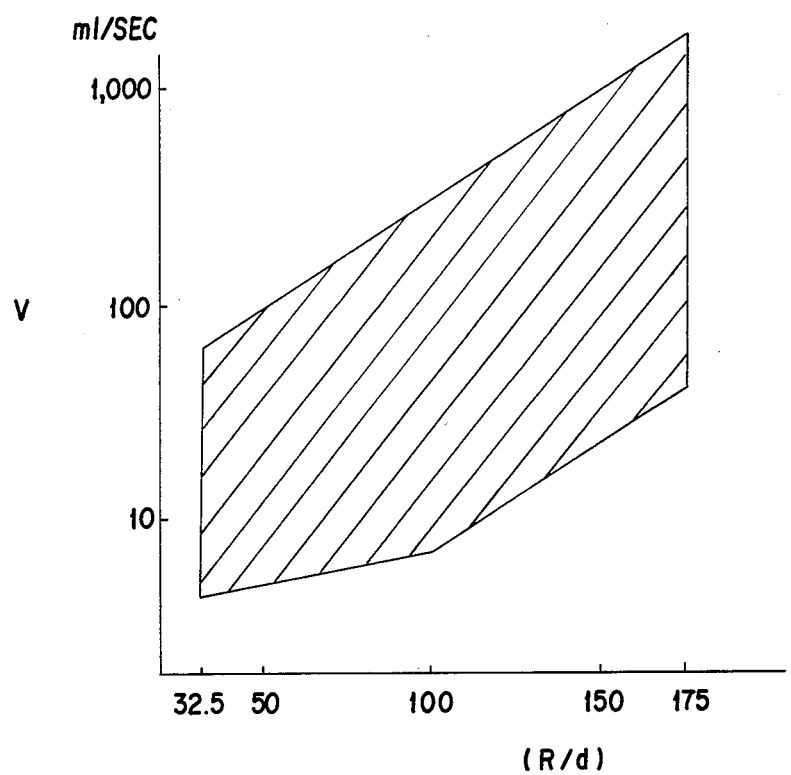
FIG. 3 is a diagram showing the relationship between the flow rate (V) of the molten resin into the mold cavity and the radius/thickness (R/d) ratio of the optical disk.

The area defined by equations (3) and (4) is the hatched part of FIG. 3.

If the flow rate (V) is not within the above-mentioned area, it is impossible to obtain satisfactory molding products.

Next, the mold structure is a very important factor that reduces the birefringence. Referring to FIGS. 4 and 5, the structure of the mold used to make the optical disk substrate for a high-density information recording medium will be explained.

FIG. 4 is a schematic representation of a known mold used for the injection molding of optical disk substrates. The molten resin from the injection cylinder (not shown) is injected into the flat annular mold cavity (14) through the nozzle touching part (11) provided at one of the split molds 10, 10', the sprue (12), and the gate (13). Usually, the surface of the mold cavity (14) is provided with the stamper (15) having submicron track grooves. The mold is provided with the temperature control means (16). In addition, the mold assembly is provided with a means to make a center hole and a means to hold the stamper; but their detailed description is omitted because they are not the elements that define this invention. The mold of this structure is described in Japanese Patent Laid-Open No. 69169/1979.

FIG. 5 shows the structure of the mold described in Japanese Patent Application No. 11900/1983 filed by the present applicant. (The same reference numerals are used for the same parts in both FIGS. 4 and 5.) What essentially differentiates the mold in FIG. 5 from that in FIG. 4 is the center core (20) that forms the center hole of the disk. The center core (20) is surrounded by the circular flash gate (21) which communicates with the nozzle touching part (11) through the sprue (22).

One of the features of this invention resides in the fact that the gate of the mold as shown in FIGS. 4 and 5 has a sectional area (S mm²) which is defined by the following equation (6).

$$\frac{1}{10} \cdot \frac{R}{d} + 10 \leq S \leq \frac{2}{10} \cdot \frac{R}{d} + 35 \quad (6)$$

wherein R is the radius (mm) of the disk and d is the thickness (mm) of the disk.

The range defined by equation (6) is indicated by the hatched part in FIG. 6.

The gate having the above-specified sectional area causes the molten resin passing through the gate to rise in temperature due to shear force, thereby improving the melt flow characteristics and preventing the extreme molecular orientation. In addition, the restricted sectional area ensures the gate sealing. If the gate has a sectional area outside the above-mentioned range, it is impossible to reduce the birefringence below 25 nm.

The above-mentioned molding process in accordance with this invention satisfies all of the following characteristic properties required for the optical disk substrate.
1. Moldability to transfer the pits and tracks.
2. Mechanical properties such as impact strength.
3. Optical properties such as low birefringence.
4. Chemical properties such as low moisture permeability and heat resistance.

The polycarbonate disk substrate of this invention can be applied to the optical recording-reproducing apparatus of any prior system. If it is to be used as the reproduction-only disk such as DAD and video disk, a reflection film of metal (such as aluminum) is formed by deposition on the recording side. If used for DRAW disk (capable of recording), it is coated with Al, Cr, Pb, Au, Rh, Zn, Cu, Sb, Te, In, Bi, $CS_2$-Te, Te-C, Te-As, dye thin film, Ag-polymer, or thermoplastic. If used for E-DRAW disk (capable of erasing and recording), it is coated with $TeO_x$, Mn-Bi, Gd-Co, Tb-Fe, Tb-Dg-Fe, Tb-Fe-Co, or As-Se-S-Ge by deposition sputtering, or ion plating. In addition to the above-mentioned film, a metal reflection film and protective film (silicon oxide or epoxy resin) are formed in many cases. Two disks are bonded together in some cases.

The invention is now described with reference to the following examples.

EXAMPLE 1

A disk substrate was injection molded from polycarbonate of 2,2-bis(4-hydroxyphenyl) propane having an average molecular weight of 15,200, by using an injection molding machine equipped with a constant feed unit. The mold cavity had a radius (R) of 150 mm and a thickness of 1.2 mm. (In other words, R/d is 125.) One of the split molds was provided with a stamper having pre-grooves.

The temperature (T) of the injection cylinder was set at 340° C., and the sectional area (S) of the mold gate was 40 mm². The residence time (t) of the resin in the injection cylinder was 10 minutes. The flow rate of the molten resin into the mold cavity was 120 ml/sec.

The resulting disk was found to have the mechanical properties which make it suitable for practice use. The absolute value of birefringence ($\Delta nd$) in the area of $40 \leq R \leq 145$ was lower than 25 nm.

EXAMPLE 2

A disk substrate was injection molded in the same way as in Example 1, except that the mold cavity had a radius (R) of 100 mm and a thickness of 1.2 mm (in other words, R/d is 83.3), the temperature (T) of the injection cylinder was set at 335° C., the sectional area (S) of the mold gate was 37 mm², the residence time (t) of the resin in the injection cylinder was 8 minutes., and the flow rate (V) of the molten resin into the mold cavity was 80 ml/sec.

The resulting disk was found to have the mechanical properties which make it suitable for practical use. The absolute value of birefringence ($\Delta nd$) in the area of $40 \leq R \leq 95$ was lower than 18 nm.

COMPARATIVE EXAMPLE 1

A disk substrate was injection molded in the same way as in Example 1, except that the polycarbonate was replaced by 2,2-bis(4-hydroxyphenyl)propane polycarbonate having an average molecular weight of 25,000.

The resulting disk was found to have the maxiumum value of birefringence of 110 nm.

COMPARATIVE EXAMPLE 2

A disk substrate was injection molded in the same way as in Example 1, except that the constant feed unit was removed from the injection molding machine so that the resin was fed by gravity from the hopper to the injection cylinder and the residence time (t) was changed to 11 minutes.

The resulting disk was found to have the maximum value of birefringence of 70 nm. In addition, burn marks were noticed on the disk.

COMPARATIVE EXAMPLE 3

A disk substrate was injection molded in the same way as in Example 1, except that the sectional area (s) of the gate was changed to 120 mm².

The reulting disk was found to have the maximum value of birefringence of 40 nm.

COMPARATIVE EXAMPLE 4

A disk substrate was injection molded in the same way as in Example 1, except that the flow rate (V) of the molten resin was changed to 10 ml/sec.

The resulting disk was found to have the maximum value of birefringence of 50 nm.

What is claimed is:
1. A method for injection molding a polycarbonate disk substrate for a high-density information recording medium, said substrate having thickness (d) of 1.0 to 2.0 mm and a radius (R) of 65 to 175 mm, consisting of injecting a molten polycarbonate resin having an average molecular weight of 14,000 to 22,000 into a flat annular cavity in a mold heated at a temperature between 80° and 130° C. from an injection cylinder having a temperature (T) selected from a range between 330° and 400° C. through the center of the mold, wherein the residence time (t minutes) of the polycarbonate resin in the injection cylinder is adjusted to

$$t \leq 14 - \frac{1}{10}(T - 300)$$

wherein T is the temperature (°C.) of the injection cylinder, and in that a gate located at the center of the flat annular cavity has a sectional area (S mm²) which satisfies following inequality:

$$\frac{1}{10}\frac{R}{d} + 10 < S < \frac{2}{10}\frac{R}{d} + 35$$

wherein R is the radius (mm) of the disk and d is the thickness (mm) of the disk.

2. An injection molding method as set forth in claim 1, wherein the injection speed (V ml/sec) at which the molten resin is forced into the cavity is $$\frac{\log 2}{100}\left(\frac{R}{d}\right) - 1.5 \log 2 + 1 \leq \log V \leq \frac{1}{100}\left(\frac{R}{d}\right) + 1.5$$

when R/d is in the range of $32.5 \leq R/d \leq 100$, and $$\frac{1}{100}\left(\frac{R}{d}\right) - 0.5 \log 2 \leq \log V \leq \frac{1}{100}\left(\frac{R}{d}\right) + 1.5$$

when R/d is in the range of $100 \leq R/d \leq 175$ (where R is the radius (mm) of the disk and d is the thickness (mm) of the disk).

* * * * *